Oct. 5, 1926.

G. B. TRYON 1,602,135

VALVE AND REAMER GRINDER

Filed Oct. 15, 1923     2 Sheets-Sheet 1

Oct. 5, 1926.  
G. B. TRYON  
VALVE AND REAMER GRINDER  
Filed Oct. 15, 1923

1,602,135

2 Sheets-Sheet 2

Inventor  
George B Tryon  
by Seymour Earle  
Attys

Patented Oct. 5, 1926.

1,602,135

UNITED STATES PATENT OFFICE.

GEORGE B. TRYON, OF DERBY, CONNECTICUT.

VALVE AND REAMER GRINDER.

Application filed October 15, 1923. Serial No. 668,511.

I do hereby declare the following, when taken in connection with the accompanying drawings and the characters of reference marked thereon, to be a full, clear, and exact description of the same, and which said drawings constitute part of this application, and represent, in—

Figure 1:
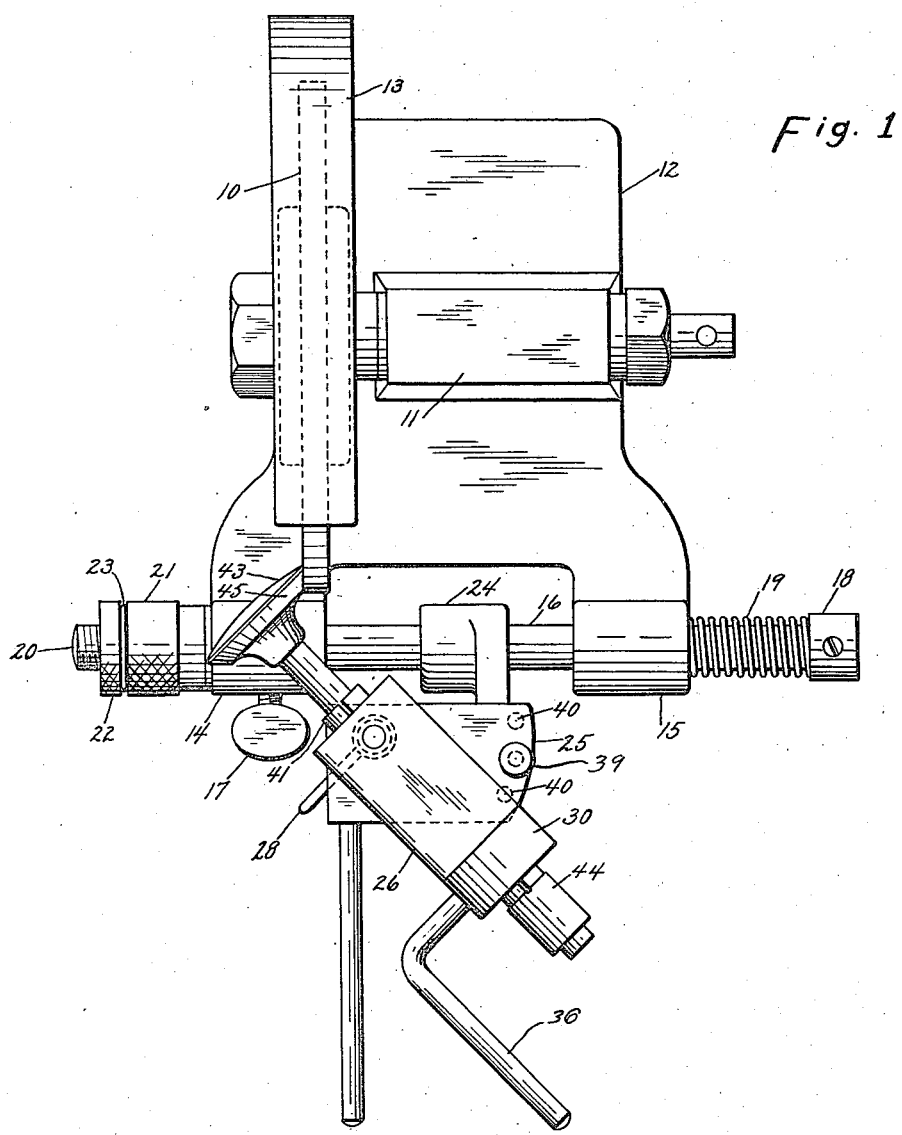

Fig. 1 a plan view of a valve or reamer grinder constructed in accordance with my invention.

Figure 2:
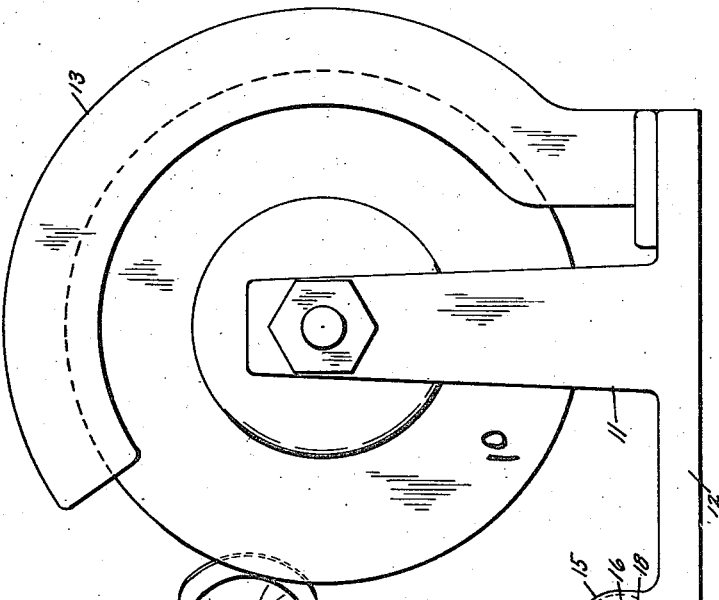

Fig. 2 a side view of the same.

Figure 3:
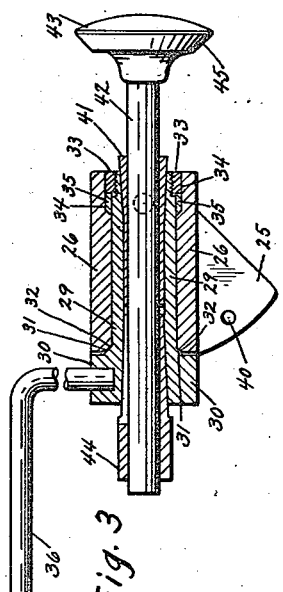

Fig. 3 a transverse, sectional view through the chuck-block, showing a valve-stem mounted therein.

Figure 4:
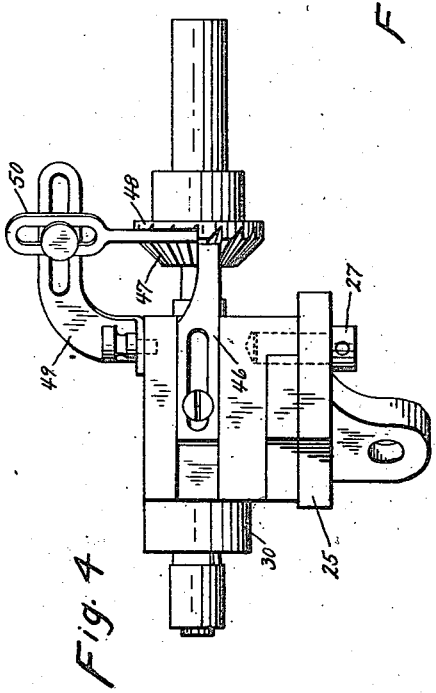

Fig. 4 a side view of the chuck-plate and chuck-block mounted thereon and showing gages connected therewith for use in mounting reamers.

Figure 5:
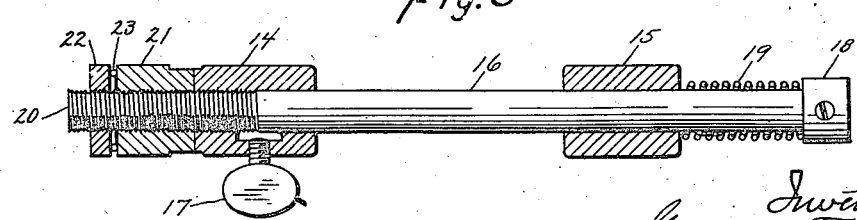

Fig. 5 a broken, sectional view, illustrating the arrangement of the rock-shaft.

This invention relates to improvement in valve and reamer grinders, and while particularly adapted for these purposes, is equally adapted for grinding any article having a surface inclined to its longitudinal axis. The object of the invention is to provide a work-holder and means for controlling the same, whereby the article to be ground is presented to one side of a grinding-disk, and the invention consists in the construction as hereinafter described and particularly recited in the claims.

In carrying out my invention, I employ a disk-grinder 10 suitably supported in an upright 11 on a base 12, and preferably partially enclosed by a hood 13, the disk being driven by any suitable means. At the forward 'edge of the base are two bearings 14 and 15, in which is mounted a rock-shaft 16, which may be locked in the bearings by a thumb-screw 17. The shaft projects beyond the outer ends of the bearings, and at one end is formed with, or has affixed to it, a head 18, between which and the bearing 15 is a spring 19. The other end 20 is threaded to receive an adjusting-nut 21, the turning of which will move the shaft longitudinally, or in a plane at right angles to the edge of the disk 10. Also mounted on the shaft is a lock-nut 22 and preferably a spring 23 will be located between the nuts 21 and 22. Affixed to the shaft is an arm 24, to which is attached a chuck-plate 25, on which is pivotally mounted a chuck-block 26, the pivot being in the form of a screw 27 provided with a handle 28, by which it may be turned so as to clamp the chuck-block to the chuck-plate. Extending into one end of the chuck-block is a sleeve 29, provided at its outer end with an enlarged collar 30, adapted to bear against one end of the block, and preferably the junction of the collar and sleeve will be in the form of a taper 31, seated in a corresponding taper 32 in the bore of the chuck-block. The inner end of the sleeve is threaded to receive a nut 33, which enters a clearance-recess 34 formed for it in the bore of the chuck-block and adapted to be turned against a bearing-collar 35 beveled at its inner end, to be seated in the tapered inner end of the recess 34, so that, while the sleeve is free to be turned in the chuck-block, it is held against longitudinal movement. Mounted in the collar 30 is a handle 36. As most valves are ground at an angle of thirty or forty-five degrees, I form the block with a flange 37 with a perforation 38, through which a pin 39 may extend into recesses 40 formed for it in the chuck-plate 25.

To grind a valve, I place a slotted, tapered sleeve 41 onto the valve-stem 42, and then insert the stem through the sleeve 29, and when adjusted, so that the valve-head 43 is in the desired position, I apply another slotted, beveled sleeve 44 over the inner end of the stem and crowd it into the sleeve, so that the stem is firmly supported throughout its length in the sleeve. The chuck-block is then adjusted on the chuck-plate, so that the beveled surface 45 of the valve-head will be presented at the proper angle to one side of the grinding-disk, and as the rock-shaft may be adjusted longitudinally by turning the nut 21, the relative position of the valve-head to the grinding-disk may be very accurately adjusted, and when properly adjusted, the rock-shaft is turned so as to move the valve-head toward the grinding-disk, and the valve-head is rotated by turning the sleeve 29 by the handle 36, so that the valve-head is ground true.

To adapt the device for conveniently grinding reamers, I mount a slide-gage 46 in one side of the chuck-block 26, and this is moved outward into line with the edge of one of the teeth 47 of a reamer 48, which is mounted in the chuck in the same manner as above described for mounting a valve-stem. On the top of the chuck-block I mount a slotted arm 49, to which is clamped a slotted gage-finger 50, and this finger is adjusted so that its lower end comes into line with the gage 46 and also in line with one of the cutting teeth. After the first tooth has been ground, the stem is turned until the next tooth is in position to engage with the gage-finger 50, so as to properly position that next tooth against the grinding-disk, and so on, until all the teeth have been ground, this gage-finger forming, to a certain extent, a resistance to prevent the reamer from being turned by the grinding-disk.

It will thus be seen that with the mechanism described, an article to be ground with a beveled surface may be properly presented to one side of a grinding-disk and firmly supported while being ground and accurately presented throughout its circumference.

I claim:

1. A grinder, comprising a base formed with an upright and with two bearings, a grinding-disk mounted in said upright, a longitudinally-movable rock-shaft mounted in said bearings in a plane parallel to the plane of the axis on which said disk turns, a spring on one end of the rock-shaft, an adjusting-nut on the opposite end of the said shaft, an arm fixed to said rock-shaft, a chuck-plate secured to said arm, a chuck-block adjustably mounted on said chuck-plate and adapted to be interlocked therewith, means for mounting a stem in said chuck-block, whereby a head on said stem will be presented to one side of the grinding-disk.

2. In a grinder, the combination with a grinding-disk, of a longitudinally-movable rock-shaft arranged in a plane parallel to the axis of the said disk, an arm fixed to said rock-shaft, a chuck-block connected with said arm, a slide mounted on one side of said chuck-block, a slotted arm mounted on the top of said chuck-block, and a gage-finger adjustably connected with said arm.

In testimony whereof, I have signed this specification.

GEORGE B. TRYON.